(12) United States Patent
Schwab

(10) Patent No.: US 6,953,495 B2
(45) Date of Patent: Oct. 11, 2005

(54) LOW-ENERGY VENTURI PRE-SCRUBBER FOR AN AIR POLLUTION CONTROL SYSTEM AND METHOD

(75) Inventor: James J. Schwab, Napa, CA (US)

(73) Assignee: Envirocare International, Inc., American Canyon, CA (US)

( * ) Notice: Subject to any disclaimer, the term of this patent is extended or adjusted under 35 U.S.C. 154(b) by 58 days.

(21) Appl. No.: 10/631,105

(22) Filed: Jul. 31, 2003

(65) Prior Publication Data

US 2005/0022667 A1 Feb. 3, 2005

(51) Int. Cl.[7] .............................................. B01D 47/10
(52) U.S. Cl. ............................ 95/221; 95/224; 96/323; 261/DIG. 54
(58) Field of Search ........................ 95/216, 221, 222, 95/223, 224; 96/323; 261/DIG. 54

(56) References Cited

U.S. PATENT DOCUMENTS

| | | | | |
|---|---|---|---|---|
| 2,852,239 A | * | 9/1958 | Vicard | 261/24 |
| 3,456,928 A | * | 7/1969 | Selway | 261/22 |
| 3,780,499 A | * | 12/1973 | Dorr et al. | 95/211 |
| 3,957,464 A | * | 5/1976 | Teller | 95/196 |
| 4,023,938 A | * | 5/1977 | Guth et al. | 95/201 |
| 4,131,439 A | * | 12/1978 | Holter | 96/243 |
| 4,141,701 A | * | 2/1979 | Ewan et al. | 95/217 |
| 4,460,517 A | * | 7/1984 | Calaceto | 261/23.1 |
| 4,957,512 A | * | 9/1990 | Denisov et al. | 95/66 |
| 5,279,646 A | | 1/1994 | Schwab | |
| 5,759,233 A | | 6/1998 | Schwab | |
| 6,149,715 A | * | 11/2000 | Keinanen et al. | 95/219 |
| 6,238,459 B1 | * | 5/2001 | Downs | 95/64 |
| 6,383,260 B1 | | 5/2002 | Schwab | |

FOREIGN PATENT DOCUMENTS

| | | | | |
|---|---|---|---|---|
| JP | 54-121475 A | * | 9/1979 | |
| JP | 60-48114 A | * | 3/1985 | |
| JP | 62-63610 A | * | 3/1987 | |

OTHER PUBLICATIONS

BETE Fog Nozzle, Inc., "TF Wide Range of Flows and Angles," at <http://www.bete.com>, 3 pgs., Apr. 4, 2002.

* cited by examiner

Primary Examiner—Frank M. Lawrence
(74) Attorney, Agent, or Firm—Sheppard Mullin Richter & Hampton LLP (57) ABSTRACT

A low-energy venturi pre-scrubber optimized for removing abrasive particles from a gaseous effluent is disclosed. While venturi scrubbers are efficiently used for at removing entrained particulates in air pollution control systems, they can be damaged due to the abrasive characteristics of entrained particles, such as silica particles greater than a micrometer in diameter. According to the present invention, high scrubbing efficiencies can be obtained in equipment that is not damaged by the abrasive particles by first removing the abrasive particles in a low-energy venturi, and then removing the remaining particles in a second scrubber. In addition to improving the lifetime and reducing the maintenance costs of the venturi, scrubbing fluids have fewer large particles, allowing their use in downstream components, such as evaporative coolers.

24 Claims, 6 Drawing Sheets

LOW-ENERGY VENTURI PRE-SCRUBBER FOR AN AIR POLLUTION CONTROL SYSTEM AND METHOD

FIELD OF THE INVENTION

This invention relates to the field of air pollution control, and is particularly directed to an improved venturi wet scrubbing system for removing contaminants from a gaseous effluent stream, such as the output of an incinerator.

BACKGROUND OF THE INVENTION

Over the past several decades the control of air pollution has become a priority concern of society. The United States and other countries have developed elaborate regulatory programs aimed at requiring factories and other major sources of air pollution to install the best available control technology (BACT) for removing contaminants from gaseous effluent streams released into the atmosphere. The standards for air pollution control are becoming increasingly stringent, so that there is a constant demand for ever more effective pollution control technologies. In addition the operating costs of running pollution control equipment can be substantial, so there is also a constant demand for more energy efficient technologies.

Concerns about pollution control are directed to more than air pollution, and removing contaminants from one medium frequently results in their introduction into another. For example, the treatment of municipal wastewater under the Clean Water Act has resulted in an enormous increase in the amount of sewage sludge that must be disposed of. Many communities lack adequate disposal sites to discard sludge that is generated by their municipal wastewater treatment plants in landfills, and are turning to incineration as an alternative method of disposal. Incineration of sludge, or other waste products, while greatly reducing the volume of material that must be disposed of on land, may result in the release of contaminants in the sludge into the atmosphere. In this regard, it is noted that the sludge generated by many municipalities is contaminated by highly toxic heavy metals and organic compounds, as well as acidic compounds such as chlorides and sulfates. The release of such compounds into the atmosphere is highly regulated, and sludge incineration systems are required to use BACT for controlling the release of contaminants into the atmosphere.

Air pollution control systems often use venturi scrubbers to remove particulates and other contaminants from the effluent streams of incinerators. Venturi scrubbers are generally recognized as having the highest fine particle collection efficiency of available scrubbing devices. As the name implies, in a venturi scrubber the effluent gas is forced or drawn through a venturi tube having a narrow "throat" portion. As the gas moves through the throat it is accelerated to a high velocity. A scrubbing liquid in the form of droplets, typically of water, is added to the venturi, usually at the throat, and enters the gas flow. The water droplets used are generally many orders of magnitude larger than the contaminant particles to be collected and, as a consequence, accelerate at a different rate through the venturi. The differential acceleration causes interactions between the water droplets and the contaminant particles, such that the contaminant particles are collected by the water droplets. The collection mechanisms involve, primarily, collisions between the particles and the droplets and diffusion of particles to the surface of the droplets. In either case, the particles are captured by the droplets. Depending on the size of the contaminant particles, one or the other of these mechanisms may predominate, with diffusion being the predominant collection mechanism for very small particles, and collision or interception being the predominant mechanism for larger particles. A venturi scrubber can also be efficient at collecting highly soluble gaseous compounds by diffusion. A detailed description of these scrubbing mechanisms is discussed in Chapter 9 of Air Pollution Control Theory, M. Crawford, (McGraw-Hill 1976).

After the particulate contaminants are collected by the water droplets, the droplets are removed from the effluent stream, which is thereby cleansed. Removal of the water droplets may be accomplished by a number of known means. For example, several removal methods rely on the fact that the droplets are relatively large and, due to inertia, cannot change direction rapidly, such as when the gas flow is directed toward a surface of an impingement plate. While the gas moves around the surface, the inertia of the relatively large water droplets causes them to strike the surface where they are captured. Likewise, if the droplets are subjected to a circular flow, as in a cyclonic separator, the large droplets are captured as a result of collisions with the wall of the separator due to centripetal force.

Although venturi scrubbers are highly effective in removing entrained fine particulates, several problems have been encountered in their operation. First, effluents may contain hard particles, such as silica, that are abrasive, particularly in the high velocity flows of the venturi throat. These particles can damage portions of the scrubber, especially when they are larger than about a micrometer in diameter. Prior art venturi scrubbers have venturi throat velocities of 200 feet per second or greater that result from pressure drops of greater than 10" $H_2O$. Entrained particles in these high-speed gas flows can be extremely abrasive, and can rapidly erode exposed surfaces within the venturi. Contraction sections and parts that intersect the flow, such as throat dampers used for pressure drop control, are particularly vulnerable to this type of erosion. Thus, for example, entrained silica particles having aerodynamic diameters greater than about 2 micrometers are removed in high energy venturi scrubbers, but can cause unacceptable erosion rates within the venturi. The aerodynamic diameter of a particle account for the size, shape, and density of particles, and is defined as the theoretical diameter of a spherical particle with unit density and the same settling velocity as an actual particle.

Second, the amount of water consumed in prior art scrubbers can be large, and it is usually advantageous to recycle the water, either as scrubber water or as cooling water. Large particles in the scrubber water can damage nozzles, pumps, and the like, and so the larger particles must be removed from the water prior to recycling. Therefore, it would be desirable to have a system and method for removing entrained abrasive particles from an effluent gas within an air pollution control system so that the scrubbing water can be more economically dealt with.

SUMMARY OF THE INVENTION

In one embodiment of the present invention, a method is provided to scrub entrained abrasive particles from a gaseous effluent. The method comprises a first and a second scrubbing step. The first scrubbing step removes a substantial proportion of the large abrasive particles by contacting liquid droplets with the gas stream in a low-energy venturi scrubber, coalescing the droplets, and removing the coalesced droplets containing the abrasive particles from the pollution control system. The second scrubbing step removes the remaining finer particles entrained in the gas stream. In one embodiment, the liquid is sprayed as droplets into the gas stream. In another embodiment, the large abrasive particles have a aerodynamic diameter of greater than about 2 micrometers. In yet another embodiment, the liquid droplets are water and have a mean mass diameter of from about 200 micrometers to about 750 micrometers. In another embodiment, the pressure drop of the first scrubbing step is from about 1" $H_2O$ to about 10" $H_2O$.

In one embodiment of the present invention, a method is provided to scrub entrained abrasive particles from a gaseous effluent. The method comprises a first and a second scrubbing step. The first scrubbing step removes a substantial proportion of the large abrasive particles by contacting liquid droplets with the gas stream in a venturi scrubber, coalescing the droplets, and removing the coalesced droplets containing the abrasive particles from the pollution control system. The second scrubbing step removes the remaining finer particles entrained in the gas stream in a second venturi scrubber. In one embodiment, the liquid is sprayed as droplets into the gas stream. In another embodiment, the large abrasive particles have a aerodynamic diameter of greater than about 2 micrometers. In yet another embodiment, the liquid droplets are water and have a mean mass diameter of from about 200 micrometers to about 750 micrometers. In another embodiment, the pressure drop of the first scrubbing step is from about 1" $H_2O$ to about 10" $H_2O$.

In another embodiment of the present invention, a method is provided for pre-treating a gas stream having entrained particles in a pollution control system. The pre-treating removes a substantial proportion of entrained large particles from the gas stream prior to treating the gas stream, which removes the remaining entrained finer particles. The method comprises scrubbing the gas stream to remove a substantial proportion of the large particles by contacting liquid droplets with the gas stream in a venturi scrubber, coalescing the droplets, and removing the coalesced droplets containing the large particles from the pollution control system. The scrubbing step is performed at a lower pressure drop than the treating step. In one embodiment, the liquid droplets are sprayed into the gas stream. Preferably, the liquid droplets comprise water and have a mean mass diameter of from about 200 micrometers to about 750 micrometers. In the preferred embodiment, the pressure drop of the scrubbing step is from about 1" $H_2O$ to about 10" $H_2O$. In one embodiment, the large particles have a aerodynamic diameter of greater than about 2 micrometers.

In yet another embodiment of the present invention, an air pollution control system for removing entrained particles from a gas stream is provided. The air pollution control system comprises a first venturi scrubber to remove a substantial proportion of particles having a aerodynamic diameter of greater than about 2 micrometers. The air pollution control system has a venturi scrubber with a pressure drop of from about 1" $H_2O$ to about 10" $H_2O$, and a droplet generator to inject droplets into the gas stream, where said droplets are water with a mean mass diameter of from about 200 micrometers to about 750 micrometers, and a droplet separator to accept the gas stream and the water droplets from the venturi scrubber and remove the droplets from the gas stream. The air pollution control system also comprises a second scrubber to remove a substantial proportion of the particles not scrubbed from the gas stream by the first scrubber.

In one aspect the present invention, a method and system for removing abrasive particle entrained in an effluent gas is provided, where the abrasive particles are removed before further treatment through subcooling/condensation stages of a wet scrubber or other scrubbing system.

In another aspect of the present invention, a method and system for removing a high percentage of ash and/or dust at low energy is provided, such that damage to metallic parts associated with removal of the particles is substantially reduced. In another aspect of the present invention, ash removal occurs in a venturi operating at low energy to aid in water recycling of scrubbers downstream of the low-energy scrubber.

In yet another aspect of the present invention, a method and system for scrubbing entrained particles is provided at low-energy venturi throat velocities of 50–200 fps.

Yet another aspect of the present invention is a method and system for efficiently scrubbing abrasive particles entrained in gases less expensively and with less maintenance than prior art methods and systems.

BRIEF DESCRIPTION OF THE DRAWINGS

The foregoing aspects and the attendant advantages of this invention will become more readily apparent by reference to the following detailed description when taken in conjunction with the accompanying drawings wherein.

Reference symbols are used in the Figures to indicate certain components, aspects or features shown therein, with reference symbols common to more than one FIG. indicating like components, aspects or features shown therein.

DETAILED DESCRIPTION OF THE INVENTION

The present invention is directed to a system and method for removing particles, especially abrasive particles, from a gas stream. The system and method of the present invention may be used to overcome the problems associated with conventional air pollution control equipment. For example, conventional venturi scrubbers remove particles at high efficiency, but at a velocity that is large enough to result in erosion of scrubber components due to abrasion by the particles. In contrast, a scrubber or method of scrubbing provided in accordance with the present invention preferentially removes abrasive particles from a gas flow in a manner that reduces erosion of scrubber components, specifically by removing the particles in a low-energy venturi. After the removal of the abrasive particles, the remaining particles can then be removed, for example by further processing of the gas through a contact condenser of a wet scrubber or other scrubbing system. Components of systems operating according to the present invention thus have longer lifetimes. In addition, the removal of abrasive particles separately has advantages for the downstream portions of the air pollution control system, since abrasive particles may interfere with condensers or other downstream components.

The present invention is thus directed to the selective removal of large, and potentially abrasive, particles. The degree to which particles can cause abrasion depends on the abundance, size, shape, velocity and composition of the particles, and the likelihood they will impact or rub against a surface. In general, the harder and denser the particles and the greater the momentum with which they strike a surface, the greater their ability to cause abrasion. As one example of abrasive particle, silica particles, in particular those having an aerodynamic diameter greater than about 2 micrometers, can cause rapid abrasion of surfaces at velocities greater than a few hundred feet per second. While the abundance, size, shape and composition of particles are not easily controllable, the momentum with which particles approach a surface can be controlled in accordance with the present invention. In particular, the present invention provides for a "low-energy venturi," by which is meant a venturi having internal gas velocities low enough to prevent erosion from large, potentially abrasive entrained particles. An exemplary embodiment of a low-energy venturi provides for the acceleration of the gas, and the entrained silica particles having a diameter greater than about one micrometer, in a venturi at a velocity of less than about 200 feet per second. Such velocities can be obtained in a venturi having a pressure drop on the order of about 10" $H_2O$ or less. Preferably the venturi velocity is from 50–200 feet per second.

Figure 1:
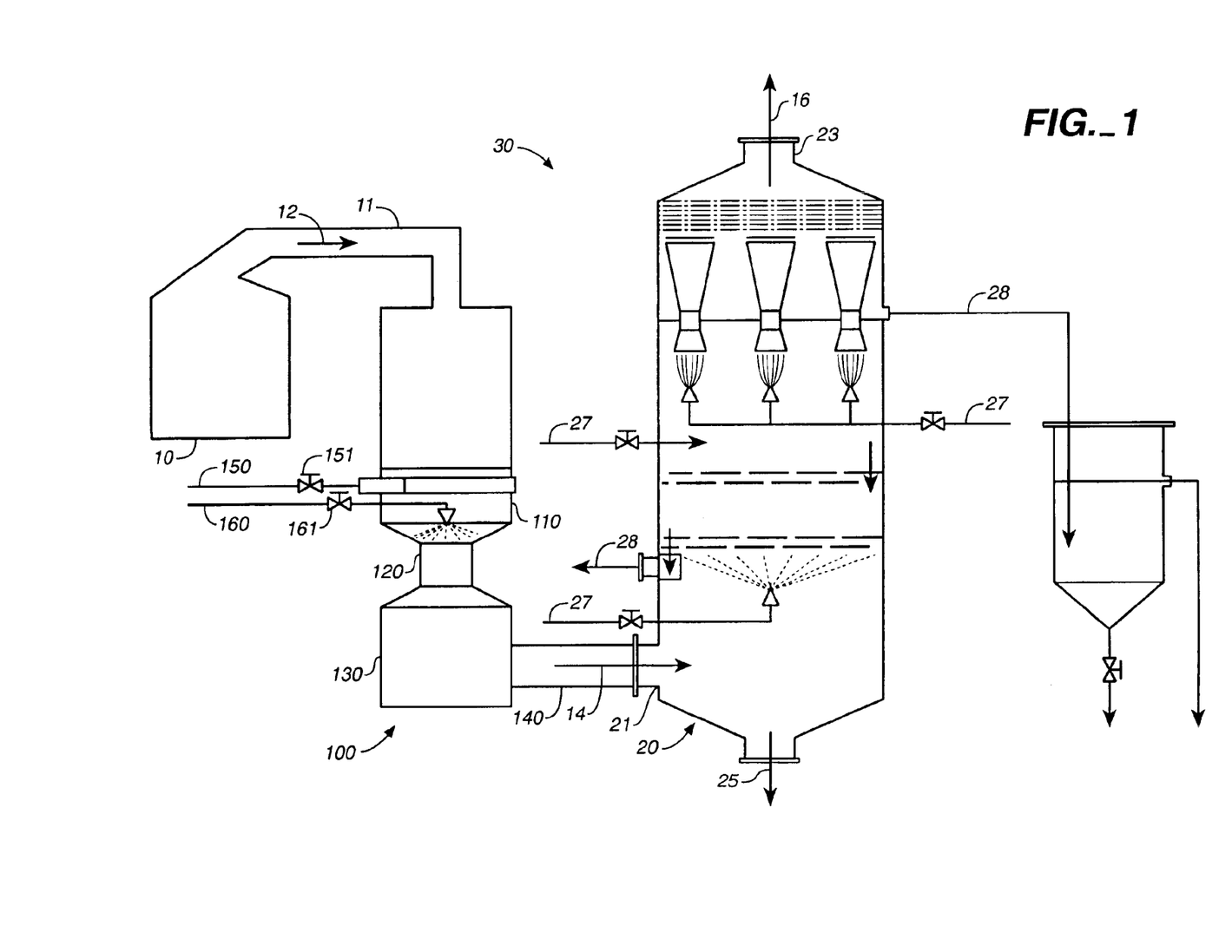
FIG. 1 is a schematic view of an air pollution control system of the present invention.

An exemplary air pollution control system 30 of the present invention is shown in FIG. 1. A gaseous effluent 12 laden with entrained particles is generated by an incinerator 10 and delivered to air pollution control system 30 though a duct 11. For purposes of discussion of air pollution control system 30, incinerator 10 is, for example, a fluidized bed combustor that processes municipal sewage sludge. Incinerator 10 produces gaseous effluent 12 with contaminant particles ranging from less than one micrometer to several tens of micrometers, or larger. An incinerator, such as incinerator 10, is shown and discussed herein as a generator of particle-laden flows to be scrubbed, and is not considered to be part of the invention.

Figure 2:
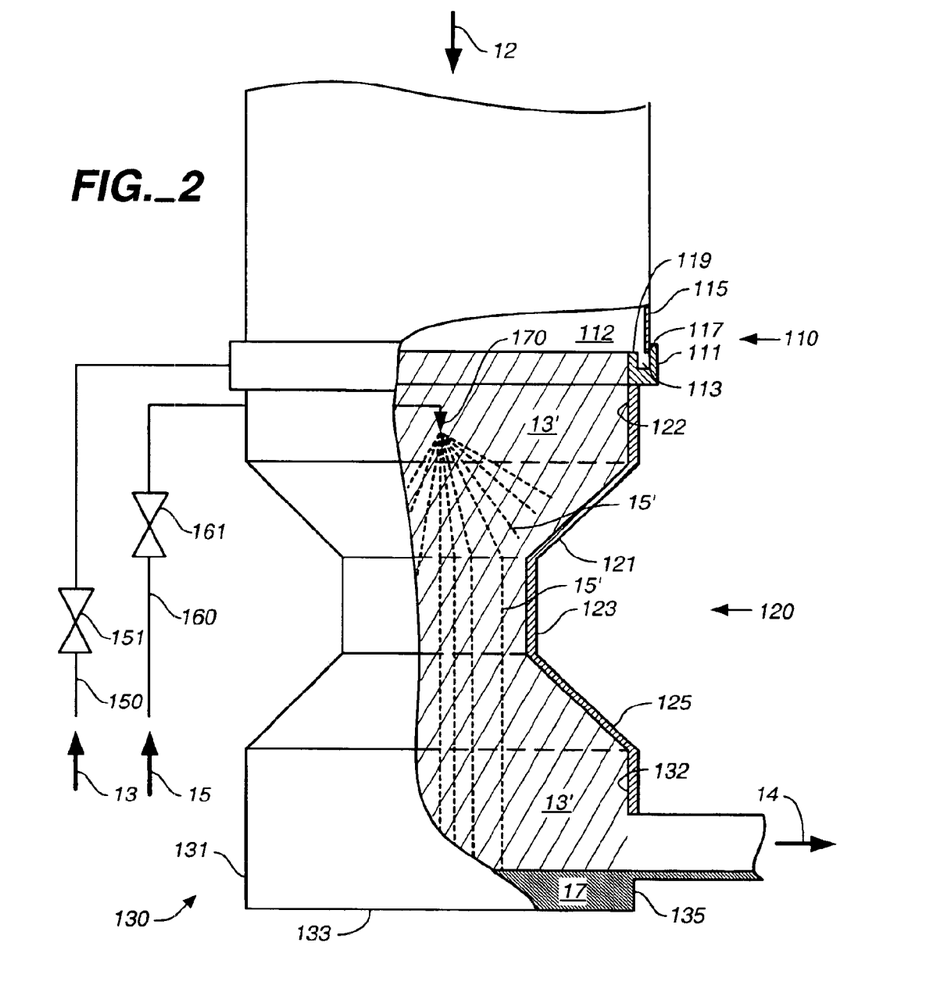
FIG. 2 is a partially schematic cross-sectional view of one embodiment of a venturi scrubber of the present invention.
Figure 3:
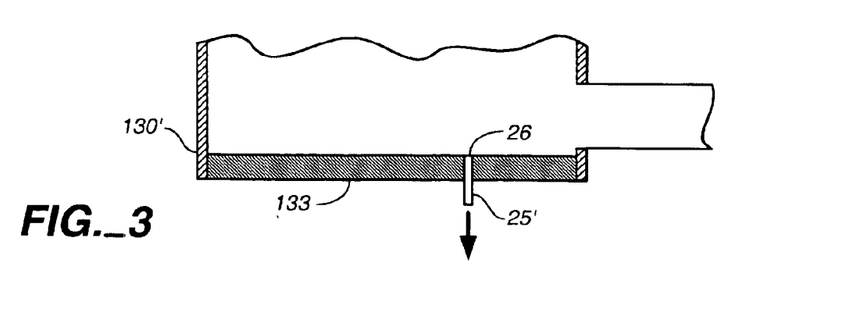
FIG. 3 is a cross-sectional view of a second embodiment of a venturi scrubber of the present invention.
Figure 4A:
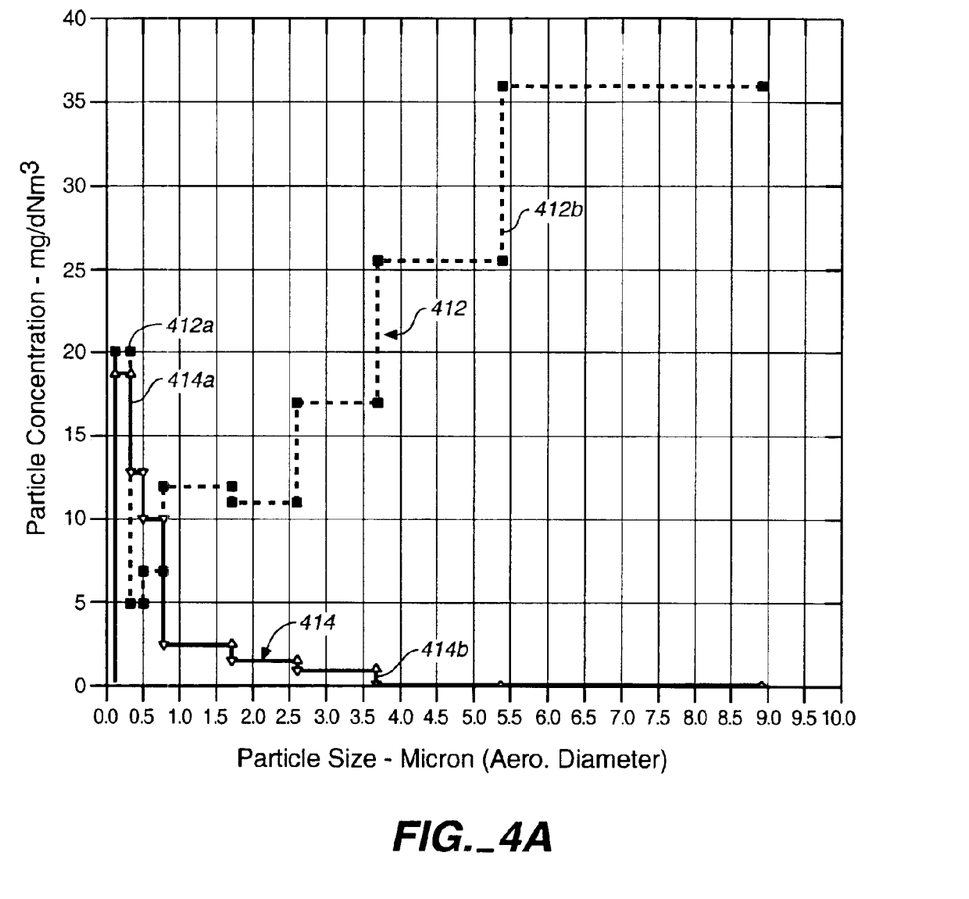
FIG. 4A is a graph of the measured size particle distribution and FIG. 4B is a graph of the measured collection efficiency from a fluidized bed reactor incinerating wet municipal sludge.
Figure 4B:
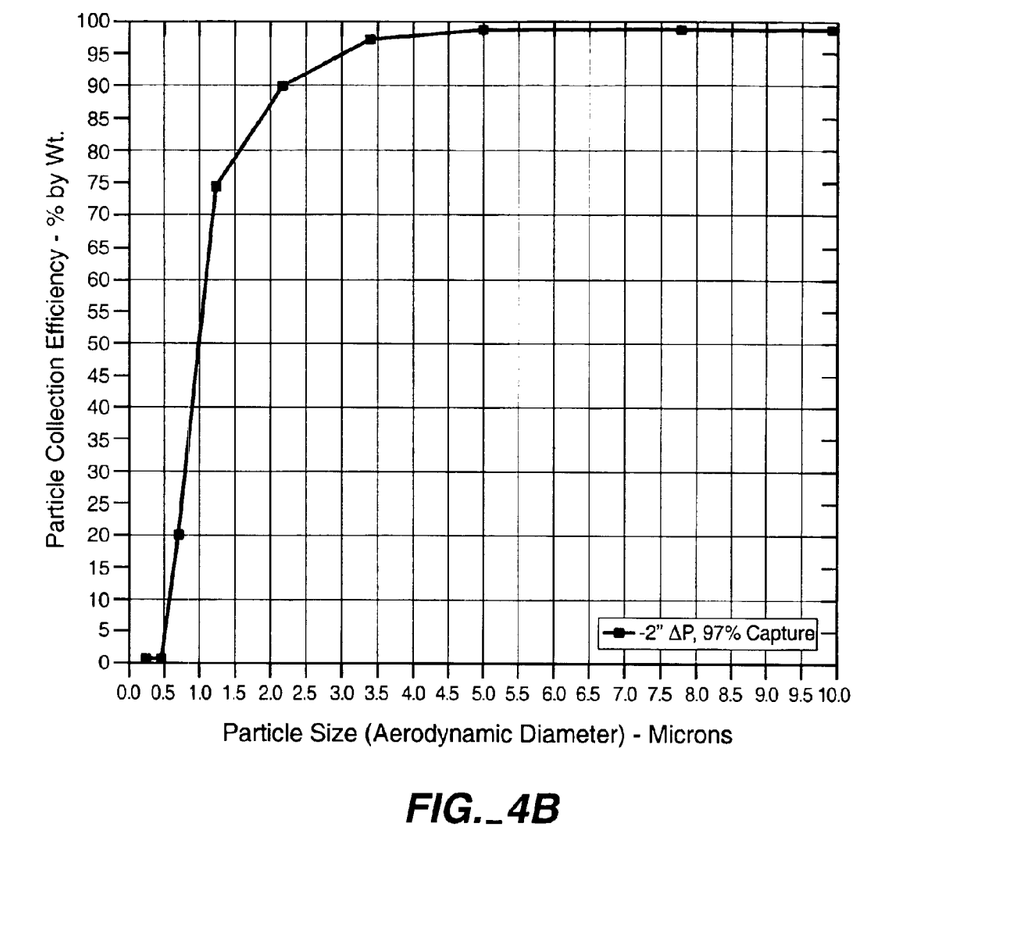

Air pollution control system 30 removes particles from gaseous effluent 12 in two stages. In a first scrubbing stage, gaseous effluent 12 flows though a first scrubber 100, where the majority of large, potentially abrasive particles are removed from the effluent, resulting in a partially scrubbed effluent as flow 14. It is preferred that the gas in flow 14 is moisture saturated. As shown in FIGS. 1 and 2, and discussed in greater detail subsequently, a first liquid 13 and a second liquid 15 are introduced into scrubber 100, take up the scrubbed particles, and are removed as a liquid 17 through a drain 25. In a second stage, second scrubber 20 receives flow 14 and removes the majority of particles of gaseous effluent 12 that are not removed in first scrubber 100. More specifically, scrubber 20 includes provisions for injecting water at locations 27, such as injection for various sprays or sheets of liquid to cool and/or scrub gases, and for removing water and scrubbed particles at locations 28. Scrubber 20 is configured such that a substantial portion of the liquid injected into locations 27 is removed at locations 28 and does not mix with liquid 17. The gaseous effluent 12, processed to substantially scrub particles in scrubbers 100 and 20, exits air pollution control system 30 as a gas flow 16. The particles scrubbed in scrubber 100 exit system 30 in liquid 17, and the particles scrubbed in scrubber 20 leave system 30 at drain 25.

In air pollution control system 30, scrubber 100 is an upstream/prequenching stage, and scrubber 20 is a multi-stage tray scrubber that acts as a contact condenser. It is generally preferred that scrubber 100 is effective enough to capture ash, which is carried way in liquid 17. In particular, it is preferred that scrubber 100 prevents ash and dust, such as a substantial fraction of particles greater than about 2 micrometers, out of the water of scrubber 20 so that water in scrubber 20 can be cycled through an atmospheric evaporative cooler, for example. It is preferred that more than 90% of the large particles are removed by scrubber 100.

Scrubber 100 is preferably a low-energy venturi scrubber, and includes an inlet section 110, a venturi throat 120, and an outlet section 130 having an outlet 140. Gaseous effluent 12 enters scrubber 100 at inlet section 110 and exits as partially scrubbed flow 14 at outlet 140. Scrubber 100 partially scrubs gaseous effluent 12 by operating at conditions that allow for the scrubbing of larger, abrasive particles, at a low energy such that they do not abrasively wear the exposed inner surfaces of the scrubber, as described subsequently.

Scrubber 20 has an inlet 21 connected to outlet 140 for accepting flow 14, and an outlet 23 for discharging flow 16. Scrubber 20 is a scrubber capable of substantially removing the remainder of particles in gaseous effluent 12 that is not removed by scrubber 100, and may be but is not limited to scrubbers as described in one or more of U.S. Pat. Nos. 5,279,646, 5,759,233, or 6,383,260, which may include a wet scrubber or another scrubbing system, such as a packed bed scrubber, a counter-flow spray chamber, or a wet electrostatic precipitator.

Scrubber 100 will now be described in greater detail with reference to FIG. 1 and FIG. 2, which is a partial section side view of the scrubber. Scrubber 100 is connected to incinerator 10 through a duct 115. Scrubber 100 has an inlet section 110, venturi 120, and outlet section 130 with internal surfaces 112, 122, and 132. Inlet section 110 has a connector 111 adapted for receiving duct 115, a first fluid inlet line 150 with a valve 151 to control the flow of a first liquid 13, and a second liquid inlet line 160 with a valve 161 to control the flow of a second liquid or quencher water 15. Venturi 120 includes a contraction section 121, a throat 123, and an expansion section 125. One or more nozzles 170 are connected to line 160 to receive liquid 15 and produce spray 15', either within inlet section 110 or venturi 120. The downstream side of scrubber 110 includes a cylindrical portion 131 having a bottom 133. Outlet 140 is located above bottom 133, resulting in a recess 135 within outlet section 130.

Connector 111 includes a cylindrical recess 113 to mate with a duct end 117 and an inner edge 119. Connector 111 receives liquid 13, which fills recess 113 up to edge 119, which is at least the bottom of end 117. Liquid 13 flows through recess 113 and over edge 119, which acts as a weir, allowing the liquid to form a liquid sheet 13' that covers the lower portions of the inside surface of scrubber 100, specifically portions of surfaces 122 and 132, to protect them from heat and erosion.

Figure 5:
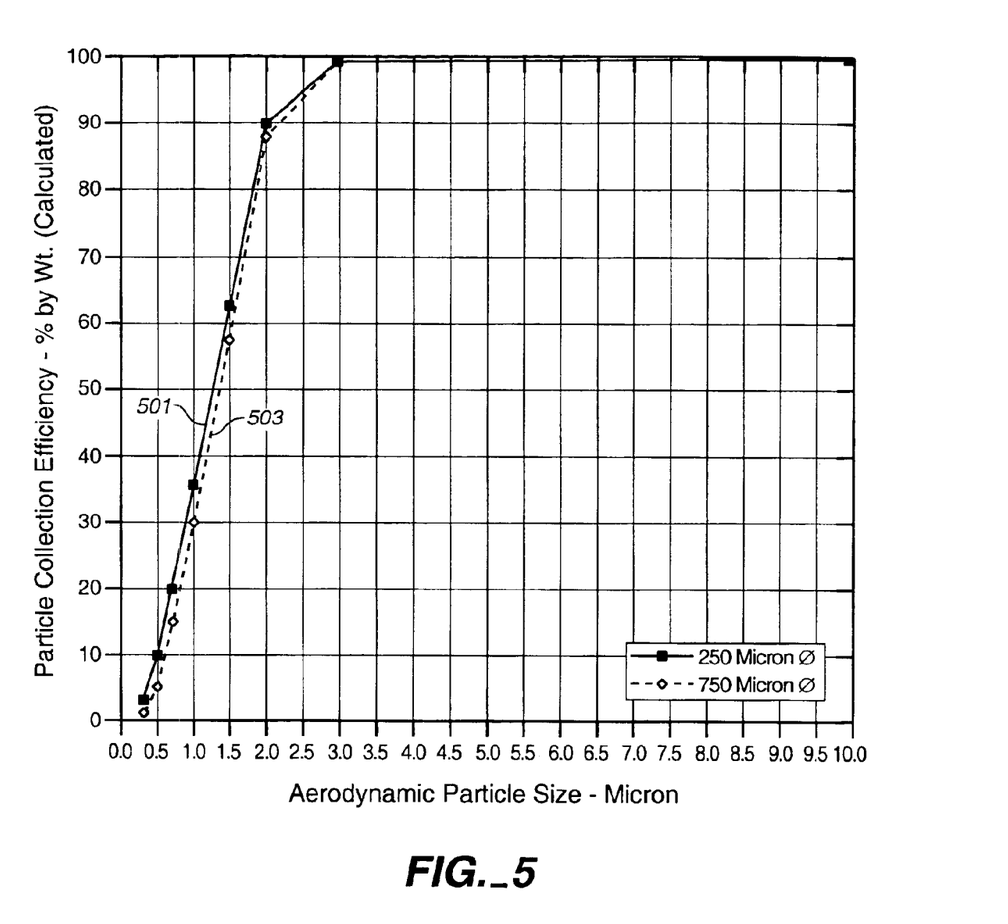
FIG. 5 is a graph of the particle collection efficiency as a function of particle size for a low-pressure scrubber processing municipal waste incinerator gases, and for two droplet sizes.

Scrubber 100 also receives liquid 15 under pressure and directs the liquid to one or more nozzles 170, resulting in a spray 15' that flows through venturi 120. The preferred location of the nozzles 170 are upstream of venturi 120 configured to direct spray 15' across inlet section 110. Alternatively, the nozzles can be placed in venturi 120 and directed with an initial direction towards inlet portion 110 to increase the relative velocity of the gas and liquid. In either case, it is important that spray 15' scrubs gaseous effluent 12 by contacting the effluent within venturi 120.

Many nozzles 170, for generating spray 15' are known in the art. As discussed subsequently, it is important that nozzles 170 generate a spray 15' of droplets having a size useful for capturing the abrasive particles and that the droplets be injected into the flow with a sufficient velocity difference between the droplets and the particles. The generation of droplets within specified size ranges,and their velocity, is well known in the art and is controllable, for example by the pressure of the liquid supplied to the nozzles, co-flowing gas (if used) and the shape of the discharge of the nozzle. As one example of droplet sizes useful for a low-energy venturi, size ranges of approximately 200 and 750 microns are effective, as described herein. Such droplets can be generated, for example, using BETE TF type nozzle at moderate liquid pressures. (BETE Fog Nozzle, Inc., Greenfield, Mass. 01301). By operating the nozzle at a pressure of 80 psig, the droplets that leave nozzle 170 cool the gaseous effluent 12 to near the moisture saturation and collect the larger entrained particles, that is those larger than about 2 micrometers.

Liquid from liquid sheet 13' and spray 15', along with any particles scrubbed by these liquids, collects in recess 135 as liquid 17. In one embodiment, as the level of liquid 17 rises, it eventually flows through outlet 140, where it proceeds to a drain, such as a drain 25 of second scrubber 20. This arrangement is sometimes referred to in the art as a wet elbow or a flooded elbow. Liquid sheet 13' and liquid 17 thermally protect scrubber 100 from hot gaseous effluent 12, and protect the internal surfaces from abrasion by any particles entrained in the effluent.

An alternative embodiment is shown in FIG. 3, as a cross-sectional view of a second embodiment of a venturi scrubber of the present invention. An outlet portion 130' includes a stand pipe 25' that rises from bottom 133 and has an open end 26 some distance above the bottom. Liquid 17 drains down the stand pipe when the level reaches the open end of the stand pipe.

Low-energy venturi scrubber 100 allows for more efficient use of water and energy than prior art systems having high-energy venturi scrubbers upstream of scrubber 20. Thus, for example, a prior art high-energy upstream venturi scrubber, having a pressure drop of 35" $H_2O$, uses approximately 10–20 gallons of water per 1000 actual cubic feet of gas (gal/1000 acf). The contaminated scrubber water of prior art systems is usually processed to remove the large particles, and the remaining water is recycled. In contrast, low-energy venturi scrubber 100 uses much less water, approximately 5 gal/1000 acf, and is more concentrated in large particles. It is thus potentially more economical to dispose of scrubbing liquid and the scrubbed large particles of scrubber 100 as liquid 17, and to recycle water of the downstream scrubber 20, which does not have a substantial amount of large particles.

Experiments of the system were performed on a fluidized bed incinerator that processes municipal sewage sludge. Prior to testing the low-energy venturi of the present invention, the incinerator was equipped with a conventional air pollution control system having a conventional (high-energy) venturi scrubber with a self-atomizing venturi, where the venturi pressure drop, ΔP, was 35" $H_2O$, followed by a multi-stage tray scrubber acting as a contact condenser. While this system produced low emissions of approximately 10 milligrams per dry normal cubic meter (mg/dNm$^3$) (0.004 grains per dry standard cubic foot, or gr/dscf), replacement of internal metal parts of the high-energy venturi as required every 3 to 6 months as a result of severe wear. The conventional system was modified by replacing the high-energy venturi scrubber with a lower energy venturi scrubber having a ΔP of 5"–10" $H_2O$ of with a BETE TF24W coaxial co-flow spray nozzle, followed by a Reverse Spray MicroMist Venturi Stage operating at a ΔP of 18" $H_2O$, as described in U.S. Pat. No. 6,383,280. The test results indicate that the replacement of the upstream high-energy venturi with a lower energy venturi is more effective at capturing dust than was the conventional system, with emissions of approximately 2 mg/dNm$^3$ (0.0009 gr/dscf). In addition, there was no sign of wear of metal parts in the low-energy venturi.

An example of the distribution of particle sizes in gaseous effluent 12 and of a partially scrubbed flow 14 is presented in FIG. 4A as a graph of the measured size particle distribution and FIG. 4B as a graph of the measured collection efficiency from a fluidized bed reactor incinerating wet municipal sludge. The data of FIGS. 4A and 4B was measured from an incinerator burning approximately 9 ton per hour of wet, municipal sewage sludge, with a venturi pressure drop, ΔP, of approximately 2" $H_2O$. The particles were predominantly ash and dust composed of silica and other inorganic compounds.

More specifically, FIG. 4A shows a graph of the distribution of particle concentration in units of mg/dNm$^3$ as a function of the aerodynamic diameter of the particles, in micrometers. Curve 412 is the particle concentration distribution for gaseous effluent 12, and curve 414 is the particle concentration distribution for the scrubbed flow 14. Curve 412 shows that the gaseous effluent 12 entering scrubber 100 has a peak particle concentration for sub-micron particles 412*a*, and an increasing concentration for larger particle sizes 412*b*. Curve 414 shows that the flow 14 leaving scrubber 100 has a peak particle concentration for sub-micron particles 414*a*, with a concentration for larger particles that decreases to approximately zero at a point 414*b* on the graph corresponding to particles greater than 3.2 micrometers. The low-energy scrubber is seen to be particularly effective at scrubbing larger particles. FIG. 4B shows a graph of the data presented as the total collection efficiency as a function of particle size for flow 14. The collection efficiency of the low-energy venturi increases with particle size, and captures more than half of the particles 1 micrometer in diameter, and more than 90% of the particles 2 micrometers in diameter. The low-energy scrubber thus removes a substantial fraction of particles having an aerodynamic diameter greater than 2 micrometers.

The scrubbing of particles in scrubber 100 depends, in part, on the size and number density of the spray droplets, the liquid-to-gas flow rate ("L/G") and the relative velocity of the particles and the droplets. The ability of a low-pressure venturi to capture large, potentially abrasive particles is illustrated in FIG. 5, which presents a graph of the calculated particle collection efficiency, in percent weight, as a function of particle aerodynamic diameter, in micrometers, for two difference spray droplet diameters. The calculations were carried out for a droplet-to-gas velocity difference, Δv, of 65 feet per second, which corresponds to a venturi pressure drop, ΔP, of approximately 2" $H_2O$, and a L/G of 5 gal/1000 acf. FIG. 5 shows two particle collection efficiency for two drop sizes: a curve 501 for liquid droplets of 250 micrometers and a curve 503 for liquid droplets of 750 micrometers. The collection efficiency increases with particle size and decreases with liquid droplet size. The curves of FIG. 5 indicate that the majority of particles greater than 3 micrometers are removed by both the 250 and 750 micrometer diameter droplets.

Figure 6:
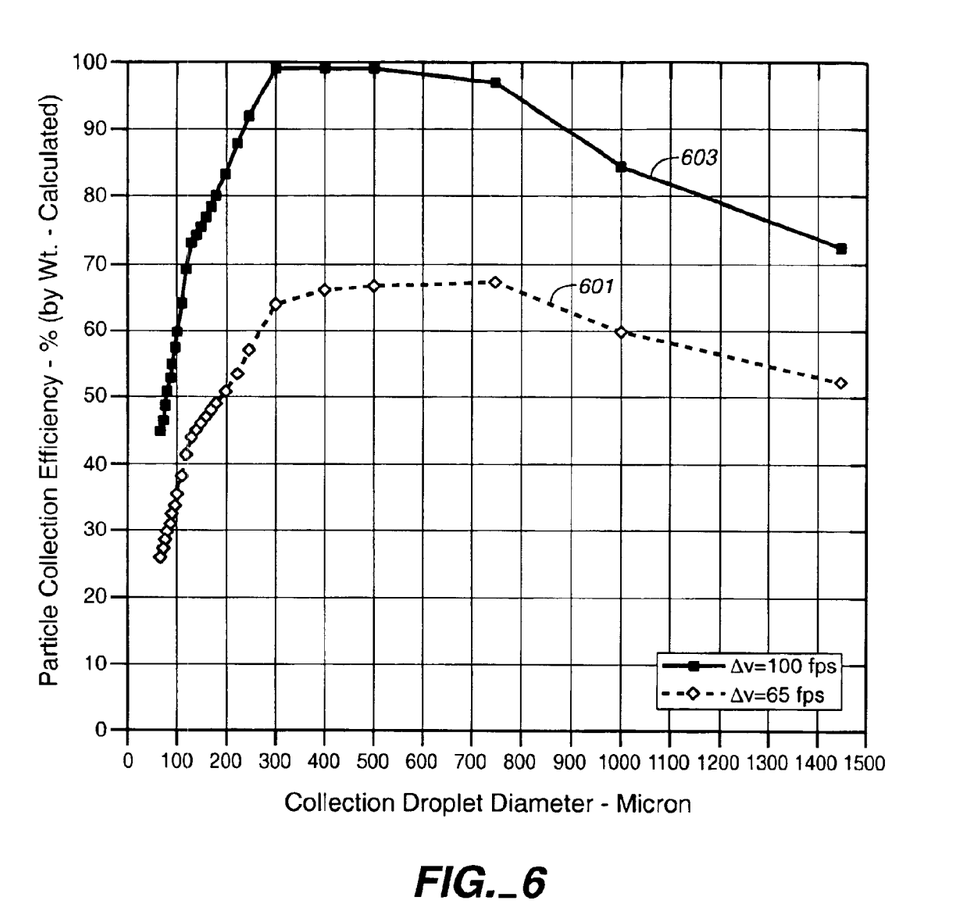
FIG. 6 is a graph of the particle collection efficiency as a function of spray droplet size for a low-pressure scrubber processing municipal waste incinerator gases, for two droplet-to-gas velocity differences.

The calculated collection efficiency of 2 micrometer particles, in weight percent, as a function of liquid droplet diameter, in microns, is shown in FIG. 6 for a constant L/G of approximately 3.8 gal/1000 acf. The graph of FIG. 6 has curves showing the collection efficiencies for two different Δv's: a curve 601 for a Δv of 65 feet per second, which corresponds to a ΔP of approximately 2" H$_2$O, and a curve 603 for a Δv of 100 feet per second, which corresponds to a ΔP of approximately 5" H$_2$O. Curves 601 and 603 both have a peak collection efficiency that is relatively constant for droplet sizes of from approximately 300 micrometers to approximately 750 micrometers, with the collection efficiency increasing with increasing Δv. Comparing the results of FIGS. 5 and 6 also shows that collection efficiency increases with L/G. Curve 603, corresponding to approximately 5" H$_2$O (as describe above), shows nearly 100% collection efficiency up to a droplet size of approximately 500 micrometers, and with a reduction in efficiency at droplets sizes above approximately 500 micrometers.

The preferred droplet size and velocity for removal of particles in a low-energy venturi vary with the size and type of particles to be removed. In general, for a given droplet diameter the particle collection efficiency increases with gas velocity (at higher flow energy), while there is a range of droplets sizes that best collect particles of a given size. In addition, the more liquid that is delivered to the gas flow in the form of droplets (the larger L/G), the large collection efficiency. A low-energy venturi can be just as efficient at capturing large particles than is a high-energy venturi, and can operate at a lower L/G—for example, an L/G of 4 or 5, as opposed to an L/G of 10–20 for a high-energy venturi. The results of calculations indicate that the droplet collection efficiency is relatively constant at a given L/G for a droplet size of from 300 to 700 micrometers, and that it is generally high for a droplet size of from 200 to 750 micrometers. In addition, the calculations indicate that the collection of particles greater than about 2 micrometers is efficient for venturi pressure drops of from 1" $H_2O$ to 10" $H_2O$. It is understood that preferred droplet size and velocities depend on many factors, including but not limited to, the amount of condensable material in the gaseous effluent, the particle size distribution, the gas temperature, and the liquid of the liquid spray. These factors not withstanding, droplet sizes can generally be selected to remove large, potentially abrasive particles from the gas flow at low energies (low ΔP) to limit the erosion of the venturi while effectively removing large particles.

The present invention includes a method and system for scrubbing an effluent having abrasive particles by first removing the abrasive particles in a low-energy venturi. The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A method of cleansing a gas stream in a pollution control system, said gas stream having entrained large abrasive particles, comprising:

scrubbing the gas stream to remove a substantial proportion of the large abrasive particles by spraying liquid droplets in the size range of about 200 micrometers to about 750 micrometer means mass diameter into said gas stream using a nozzle in a low-energy venturi scrubber, coalescing said droplets, and removing the coalesced droplets containing said large abrasive particles from the pollution control system; and thereafter, scrubbing the gas stream to remove the remaining finer particles entrained in the gas stream wherein the pressure drop across said low-energy venturi scrubber is between about 1" of water to about 10" of water.

2. The method of claim 1, wherein more than about 90% of said large abrasive particle having a aerodynamic diameter of greater than about 2 micrometer are removed by said low-energy venturi scrubber.

3. A method of cleaning a gas stream in pollution control system, said gas stream having entertained particles, comprising:

scrubbing the gas stream to remove a substantial proportion of the large particles by contacting liquid droplets with said gas stream in a low-energy venturi scrubber, coalescing said droplets, and removing the coalesced droplets containing said large particles from the pollution control system; and thereafter, scrubbing the gas stream to remove the remaining finer particles entrained in the gas stream, wherein said second scrubbing step includes contacting said gas stream with a second scrubbing liquid, wherein said coalesced drops of said first scrubbing step are disposed of, and wherein said second scrubbing liquid is recycled in said air pollution control system.

4. The method of claim 1, wherein said first scrubbing step has pressure drop, wherein said second scrubbing step has a second pressure drop, and wherein said first pressure drop is less than about half of said second pressure drop.

5. The method of cleaning a gas stream in a pollution control system, said gas stream having entrained large abrasive particles, comprising:

scrubbing the gas stream to remove a substantial portion of the large abrasive particles by spraying liquid droplets having a mean mass diameter in the range of about 200 micrometer to about 750 micrometer into said gas stream in a venturi scrubber, coalescing said droplets, and removing the coalesced droplets containing said large abrasive particles from the pollution control system, where said scrubbing occurs with a pressure drop; and thereafter, scrubbing the gas stream in a second venturi scrubber to remove the remaining finer particles entrained in the gas stream, wherein said scrubbing occurs with a pressure drop; wherein the first scrubbing step is preformed at a lower pressure drop than the second scrubbing step.

6. The method of claim 5, wherein said pressure drop of said first scrubbing step is from about 1" $H_2O$ to about 10" $H_2O$.

7. The method of claim 5, wherein more than about 90% of said large abrasive particles having a aerodynamic diameter of greater than about 2 micrometers are removed by said low-energy venturi scrubber.

8. A method of cleaning a gas stream in a pollution control system, said gas stream having entrained particles, comprising:

scrubbing the gas stream to remove a substantial proportion of the large particles by contacting liquid droplets with said gas stream in a venturi scrubber, coalescing said droplets, and removing the coalesced droplets containing said large particles from the pollution control system, where said scrubbing occurs with a pressure drop; and thereafter, scrubbing the gas stream in a venturi scrubber to remove the remaining finer particles entrained in the gas stream, wherein said scrubbing occurs with a pressure drop;

wherein the first scrubbing step is performed at a lower pressure drop than second scrubbing step, and wherein said second scrubbing step includes contacting said gas stream with a second scrubbing liquid, wherein said coalesced drops of said first scrubbing step are disposed of, and wherein said second scrubbing liquid is recycled in said air pollution control system.

9. A method of pre-treating a gas stream having entrained abrasive particles in a pollution control system, where said pre-treating removes a substantial proportion of entrained large abrasive particles from said gas stream prior to treating the gas stream to remove the remaining entrained finer particles, comprising:

scrubbing the gas stream in a low-energy venturi scrubber to remove a substantial proportion of the large abrasive particles by spraying liquid droplets having a mean mass diameter in the range of about 200 micrometer to about 750 micrometer into said gas stream, coalescing said droplets, and removing the coalesced droplets containing said particles from the pollution control system.

10. The method of claim 9, wherein said sprayed liquid droplets comprise water and have a mean mass diameter of from about 300 micrometers to about 700 micrometers.

11. The method of claim 9, wherein said pressure drop of said scrubbing step is from about 1" $H_2O$ to about10" $H_2O$.

12. The method of claim 9, wherein more than about 90% of said large particles having a aerodynamic diameter of greater than about 2 micrometers are removed by said low-energy venturi scrubber.

13. The method of claim 11, wherein said coalesced drops are disposed of.

14. An air pollution control system for removing entrained particles from a gas stream comprising: a first scrubber to remove a substantial proportion of particles having a aerodynamic diameter of greater than about 2 micrometers, said first scrubber having a venturi scrubber with a gas stream pressure drop of from about 1" $H_2O$ to about 10" $H_2O$, and a droplet generator to spray droplets into the gas stream, where said droplets comprise water with a mean mass diameter of from about 200 micrometers to about 750 micrometers, and a droplet separator to accept the gas stream and said water droplets from said venturi scrubber and remove said droplets from the gas stream; and a second scrubber to remove a substantial proportion of the particles not scrubbed from the gas stream from said first scrubber.

15. The air pollution control system of claim 14 wherein said droplet generator comprises a nozzle.

16. The air pollution control system of claim 14 wherein said droplets have a mean mass diameter in the range of about 200 micrometer to about 700 micrometers.

17. The air pollution control system of claim 14 wherein said spray droplets have a mean mass diameter less than about 500 micrometers.

18. The method of claim 1 wherein said spray droplets have a mean mass diameter less than about 500 micrometers.

19. The method of claim 9 wherein said spray droplets have a mean mass diameter less than about 500 micrometers.

20. The method of claim 1 wherein said the throat velocity in said low energy venturi scrubber is in the range of 50–200 fps.

21. The method of claim 9 wherein said the throat velocity in said low energy venturi scrubber is in the range of 50–®fps.

22. The method of claim 1 wherein said pressure drop in said low energy venturi is less than about 5" water.

23. The method of claim 9 wherein said pressure drop in said low energy venturi is less than about 5" water.

24. The air pollution control system of claim 14 wherein said pressure drop in said venturi is less than about 5" water.

* * * * *